United States Patent

Rosa

[11] Patent Number: 5,484,183
[45] Date of Patent: Jan. 16, 1996

[54] ADJUSTABLE SUN VISOR ATTACHMENT

[76] Inventor: Thomas F. Rosa, 25 Ward Ave., Middletown, R.I. 02842-5512

[21] Appl. No.: 368,855

[22] Filed: Jan. 5, 1995

[51] Int. Cl.$^6$ .................................................. B60J 3/02
[52] U.S. Cl. .................................. 296/97.6; 296/97.11
[58] Field of Search .................... 296/97.6, 97.8, 296/97.11

[56] References Cited

U.S. PATENT DOCUMENTS

| | | | |
|---|---|---|---|
| 2,382,875 | 8/1945 | Handley | 296/97.6 |
| 2,629,626 | 2/1953 | Ziler | 296/97 |
| 3,208,792 | 9/1965 | Martin | 296/97 |
| 3,306,657 | 2/1967 | Turner | 296/97.6 |
| 3,522,968 | 8/1970 | Honor, Sr. | 296/97.6 |
| 3,617,088 | 11/1971 | Graham | 296/97 R |
| 3,877,745 | 4/1975 | Girard | 296/97.6 |
| 4,984,840 | 1/1991 | Lansing | 296/97.6 |

FOREIGN PATENT DOCUMENTS

| | | | |
|---|---|---|---|
| 2400796 | 7/1975 | Germany | 296/97.6 |
| 5668574 | 11/1982 | Japan | 296/97.12 |
| 315321 | 12/1988 | Japan | 296/97.8 |

Primary Examiner—David M. Mitchell
Assistant Examiner—Kia M. Robinson
Attorney, Agent, or Firm—Richard L. Miller

[57] ABSTRACT

An adjustable sun visor attachment for a sun visor in a vehicle comprising an elongated track component. Members are for attaching the track component horizontally and adjacent to a long edge of the sun visor. A generally rectangular panel is provided. A structure is for coupling the panel to the track component, so that the panel can be adjusted lengthwise in the track component along the long edge of the sun visor.

2 Claims, 1 Drawing Sheet

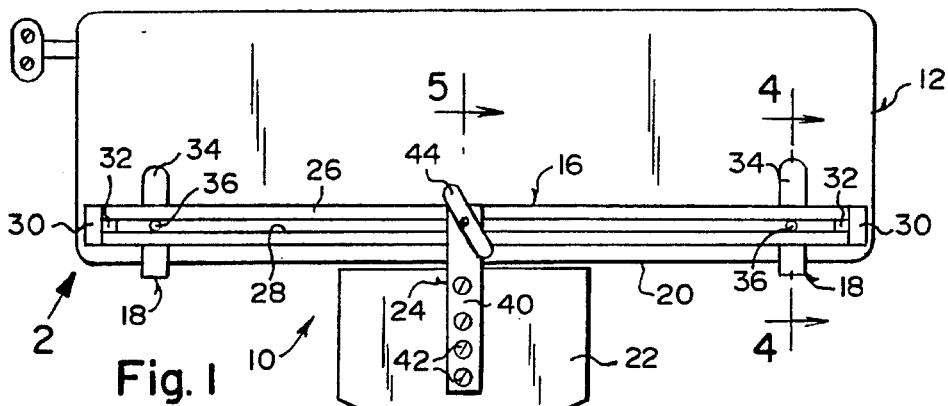
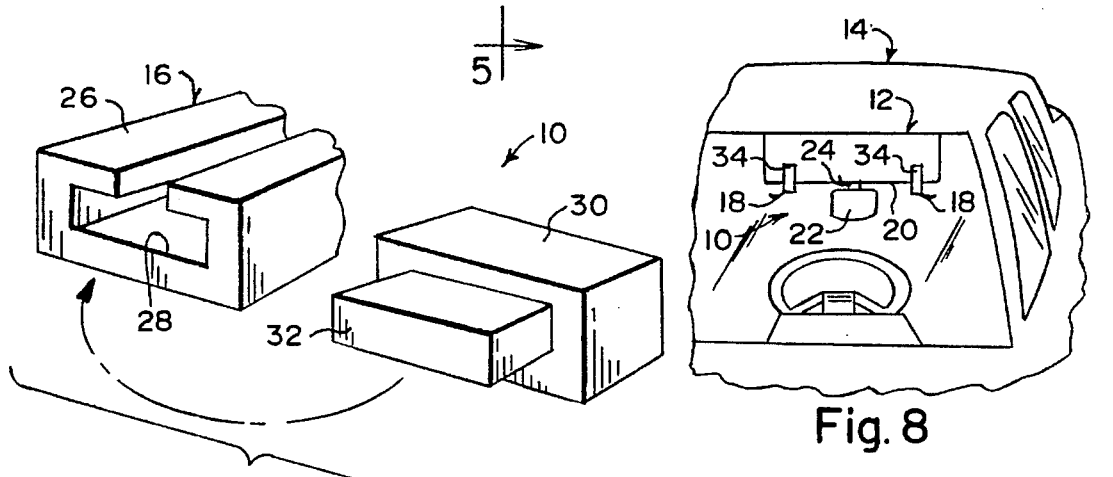
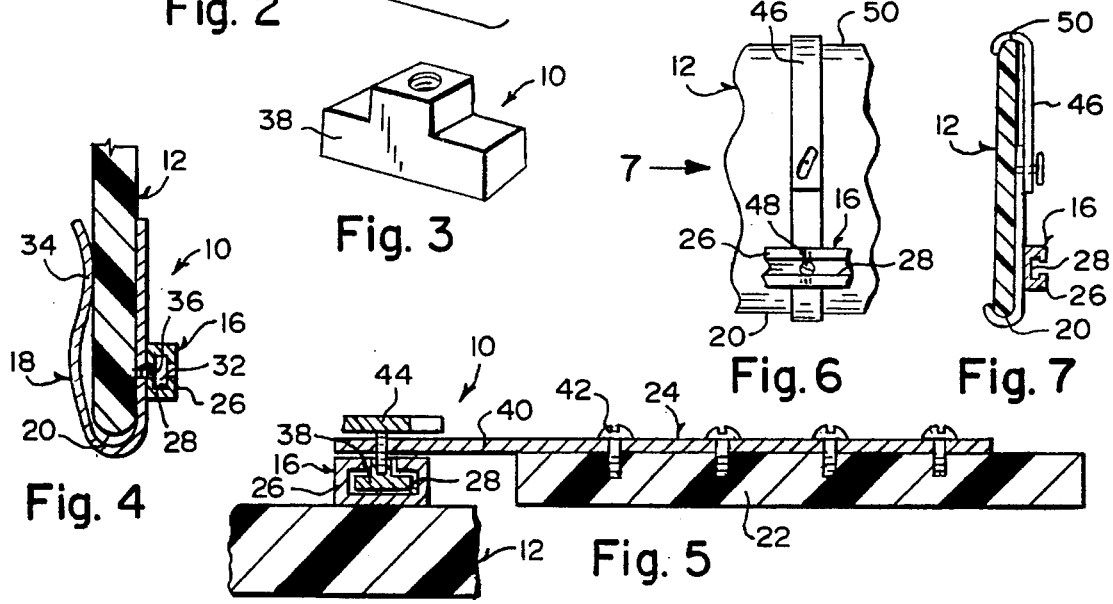

ADJUSTABLE SUN VISOR ATTACHMENT

BACKGROUND OF THE INVENTION

The instant invention relates generally to sun visor extensions and more specifically it relates to an adjustable sun visor attachment.

Numerous sun visor extensions have been provided in prior art that are adapted to be coupled to existing sun visors in a vehicle. For example, U.S. Pat. Nos. 2,629,626 to Ziler; 3,208,792 to Martin; 3,617,088 to Graham and 4,984,840 to Lansing all are illustrative of such prior art. While these units may be suitable for the particular purpose to which they address, they would not be as suitable for the purposes of the present invention as heretofore described.

SUMMARY OF THE INVENTION

A primary object of the present invention is to provide an adjustable sun visor attachment that will overcome the shortcomings of the prior art devices.

Another object is to provide an adjustable sun visor attachment that can clip onto a long edge of a sun visor and be adjusted lengthwise along the long edge.

An additional object is to provide an adjustable sun visor attachment that includes a T-channel which will allow for the lengthwise adjustment along the long edge of the sun visor.

A further object is to provide an adjustable sun visor attachment that is simple and easy to use.

A still further object is to provide an adjustable sun visor attachment that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a diagrammatic elevational view of the instant invention installed on a typical vehicle sun visor;

FIG. 2 is an enlarged diagrammatic exploded perspective view with parts broken away of a track component and one end cap of the instant invention taken in the direction of arrow 2 in FIG. 1;

FIG. 3 is a diagrammatic perspective view of a typical slide element which engages the track component in figure FIG. 4 is a diagrammatic cross sectional view taken on line 4—4 of FIG. 1;

FIG. 5 is a diagrammatic cross sectional view with parts broken away taken on line 5—5 of FIG. 1;

FIG. 6 is a diagrammatic elevational view of a modified clamp of the instant invention;

FIG. 7 is a diagrammatic side elevational view taken in the direction of arrow 7 in FIG. 6; and FIG. 8 is a diagrammatic perspective view with parts broken away illustrating a motor vehicle with the instant invention installed therein.

DETAILED DESCRIPTION OF THE PREFERRED EMBODIMENTS

Turning now descriptively to the drawings, in which similar reference characters denote similar elements throughout the several views, FIGS. 1 through 5 illustrate an adjustable sun visor attachment 10 for a sun visor 12 in a vehicle 14 comprising an elongated track component 16. Members 18 are for attaching the track component 16 horizontally and adjacent to a long edge 20 of the sun visor 12. A generally rectangular panel 22 is provided. A structure 24 is for coupling the panel 22 to the track component 16, so that the panel 22 can be adjusted lengthwise in the track component 16 along the long edge 20 of the sun visor 12.

The track component 16 consists of an elongated flat bar 26 having a T-shaped channel 28 longitudinally formed there along. A pair of end caps 30 are provided. Each end cap 30 having a projection 32 that is inserted into one end of the T-shaped channel 28 in the flat bar 26.

The attaching members 18 include a pair of spring clamps 34. A pair of fasteners 36 are for securing each spring clamp 34 transversely to the flat bar 26, so that the spring clamps 34 can be clipped onto the sun visor 12 at the one edge 20 thereof.

The coupling structure 24 contains a slide element 38, which rides within the T-shaped channel 28 within the flat bar 26. A bracket arm 40 is provided. A plurality of screws 42 are to affix the bracket arm 40 to the panel 22 in a vertical position. A wing head set screw 44 is to secure an upper end of the bracket arm 40 to the slide element 38. When the wing head set screw 44 is tightened, the slide element 38 will be held in a stationary position within the T-shaped channel 28 of the flat bar 26.

The attaching members 18 can also be a pair of visor edge gripping adjustable clamps 46, one of which is shown in FIGS. 6 and 7. A pair of fasteners 48 is for securing each visor edge gripping adjustable clamp 46 transversely to the flat bar 26. The visor edge gripping adjustable clamps 46 can be clamped onto the sun visor 12 at the opposite long edges 20 and 50 thereof.

OPERATION OF THE INVENTION

To use the adjustable sun visor attachment 10, a person simply attaches the flat bar 26 via the spring clamps 34 or the visor edge gripping adjustable clamps 46 to the sun visor 12. The wing head set screw 44 is loosened. The slide element 38 can now ride within the T-shaped channel 28 in the flat bar 26. When the panel 22 reaches the desired position to block out the sun's rays, the wing head set screw 44 is tightened to hold the panel 22 in place with respect to the sun visor 12 in the vehicle 14.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An adjustable sun visor attachment for a sun visor in a vehicle comprising:
    a) an elongated track component including:
       an elongated flat bar having a T-shaped channel longitudinally formed there along; and a pair of end caps, each said end cap having a projection inserted into one end of said T-shaped channel in said flat bar;

b) means for attaching said track component horizontally and adjacent to a long edge of the sun visor including;
   a pair of spring clamps; and a pair of fasteners for securing each said spring transversely to said flat bar, so that said spring clamps can be clipped onto the sun visor at the long edge thereof;
c) a generally rectangular panel; and
d) means for coupling said panel to said track component, so that said panel can be adjusted lengthwise in said track component along the long edge of the sun visor said coupling means including
   a slide element which rides within said T-shaped channel within said flat bar;
   a bracket arm;
   a plurality of screws to affix said bracket arm to said panel in a vertical position; and
   a wing head set screw arranged to secure an upper end of said bracket arm to said slide element, so that said wing head set screw is adjustable between loose and tight positions in which said slide element can be moved along said T-shaped channel of said flat bar to vary the position of the panel and in which said slide element is held stationary within said T-shaped channel releasably to fix the panel stationary in a selected position along the channel, respectively.

2. An adjustable sun visor attachment for a sun visor in a vehicle comprising:
a) an elongated track component including:
   an elongated flat bar having a T-shaped channel longitudinally formed there along; and
   a pair of end caps, each said end cap having a projection inserted into one end of said T-shaped channel in said flat bar;
b) means for attaching said track component horizontally and adjacent to a long edge of the sun visor including:
   a pair of visor edge gripping adjustable clamps; and
   a pair of fasteners for securing each said visor edge gripping adjustable clamp transversely to said flat bar, so that said visor edge gripping adjustable clamps can be clamped onto the sun visor at the opposite long edges thereof;
c) a generally rectangular panel; and
d) means for coupling said panel to said track component, so that said panel can be adjusted lengthwise in said track component along the long edge of the sun visor, said coupling means including:
   a slide element which rides within said T-shaped channel within said flat bar;
   a bracket arm;
   a plurality of screws to affix said bracket arm to said panel in a vertical position; and
   a wing head set screw arranged to secure an upper end of said bracket arm to said slide element, so that said wing head set screw is adjustable between loose and tight positions in which said slide element can be moved along said T-shaped channel of said flat bar to vary the position of the panel and in which said slide element is held stationary within said T-shaped channel releasably to fix the panel stationary in a selected position along the channel, respectively.

* * * * *